G. G. Baldwin,

Earth Closet.

No. 102,750. Patented May 10. 1870.

United States Patent Office.

GEORGE G. BALDWIN, OF MILFORD, CONNECTICUT.

Letters Patent No. 102,750, dated May 10, 1870.

IMPROVEMENT IN EARTH-CHAMBER VESSELS.

The Schedule referred to in these Letters Patent and making part of the same.

*To all whom it may concern:*

Be it known that I, GEORGE G. BALDWIN, of Milford, in the county of New Haven and State of Connecticut, have invented a new and improved Earth-Closet; and I do hereby declare that the following is a full, clear, and exact description thereof, which will enable others skilled in the art to make and use the same, reference being had to the accompanying drawings forming part of this specification.

Similar letters of reference indicate corresponding parts.

This invention relates to a new earth-closet, which is so arranged that the person occupying it may readily apply the necessary quantity of earth, and that the pan or receptacle can be removed and replaced when desired.

The invention consists in constructing the outer case or chest A of the closet in two compartments, $a$ and $b$, by arranging in it a transverse partition, $c$, and in hinging or pivoting to the upper part of said partition a chute, B, which serves to conduct the earth from the compartment $a$ into $b$.

The pan or receptacle C of the excrements is placed in the compartment $b$, the chute reaching far enough into the latter to convey the earth into the receptacle C.

The earth with which the contents of the pan are to be covered is contained in the compartment $a$, and can, by means of a suitable shovel, D, be readily conveyed into the chute, and thence into the pan.

Figure 1:
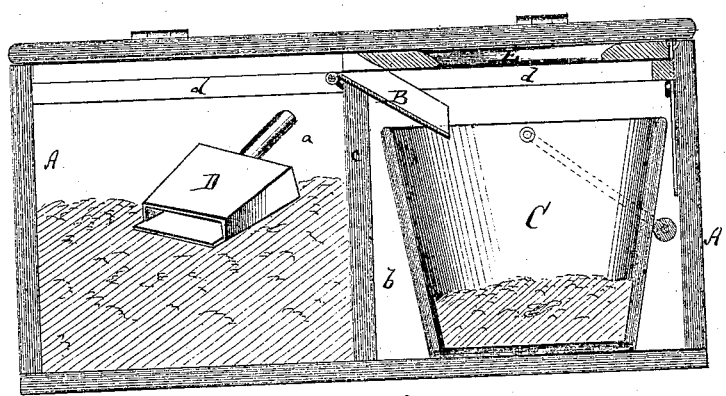
Figure 1 represents a vertical longitudinal section of my improved earth-closet.
Figure 2:
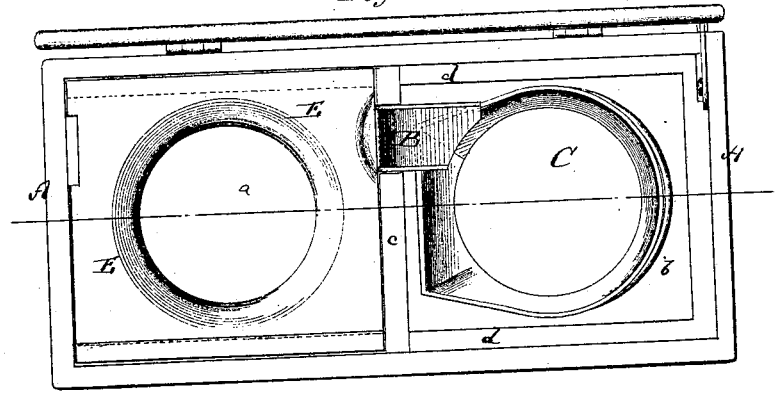
Figure 2 is a plan or top view of the same.

I provide a sliding seat, E, which rests upon longitudinal rails $d\ d$, that are arranged in the chest. The seat is ordinarily to be above the compartment $b$; but when the receptacle C is to be removed, to be emptied, the seat is moved over the compartment $a$, as in fig. 2, and the chute swung up, to allow the ready removal and reinsertion of the pan.

Having thus described my invention,

I claim as new and desire to secure by Letters Patent—

The combination of the pivoted chute B with the chest A of an earth-closet, the said chest being, by a partition, C, divided into two compartments, $a$ and $b$, as set forth.

GEO. G. BALDWIN.

Witnesses:
ANON CLARK,
ELI N. CLARK.